United States Patent [19]

Hawkes et al.

[11] 4,200,356
[45] Apr. 29, 1980

[54] COUPLER FOR OPTICAL COMMUNICATION SYSTEM

[75] Inventors: Thaddéus Hawkes; Jean C. Reymond; Roger Trocellier, all of Paris, France

[73] Assignee: Thomson-CSF, Paris, France

[21] Appl. No.: 854,893

[22] Filed: Nov. 25, 1977

[30] Foreign Application Priority Data

Nov. 30, 1976 [FR] France .................. 76 36069

[51] Int. Cl.$^2$ .................................. G02B 5/14
[52] U.S. Cl. ........................... 350/96.16; 350/96.20
[58] Field of Search ............... 350/96.15, 96.16, 96.20, 350/96.22

[56] References Cited

U.S. PATENT DOCUMENTS

| | | | |
|---|---|---|---|
| 3,756,688 | 9/1973 | Hudson et al. | 350/96.16 |
| 3,870,396 | 3/1975 | Racki et al. | 350/96.16 |
| 3,874,779 | 4/1975 | Thiel | 350/96.16 |
| 3,874,780 | 4/1975 | Love | 350/96.16 |
| 3,874,781 | 4/1975 | Thiel | 350/96.16 |
| 3,883,222 | 5/1975 | Gunderson | 350/96.16 |
| 3,901,581 | 8/1975 | Thiel | 350/96.16 |
| 4,011,005 | 3/1977 | Hawkes et al. | 350/96.15 |
| 4,072,399 | 2/1978 | Love | 350/96.16 |

FOREIGN PATENT DOCUMENTS

2653815  6/1977  Fed. Rep. of Germany ........ 350/96.16

*Primary Examiner*—John K. Corbin
*Assistant Examiner*—John D. Lee
*Attorney, Agent, or Firm*—Cushman, Darby & Cushman

[57] ABSTRACT

A coupler for interconnecting transmission lines in an optical communication system. In a preferred embodiment it comprises an elongated bi-conically shaped rod of transparent material which continues into two cylindrical mixing rods. The lines are split up into two groups coupled to respective ones of the two plane endfaces of the coupler. The dimensions of each tapered central portion are determined such that the radiation pattern in the common plane of the identical minor bases is substantially hemispherical no matter what the direction of propagation of the light modes along the axis from one end to the other, given the numerical aperture of the associated transmission lines.

8 Claims, 12 Drawing Figures

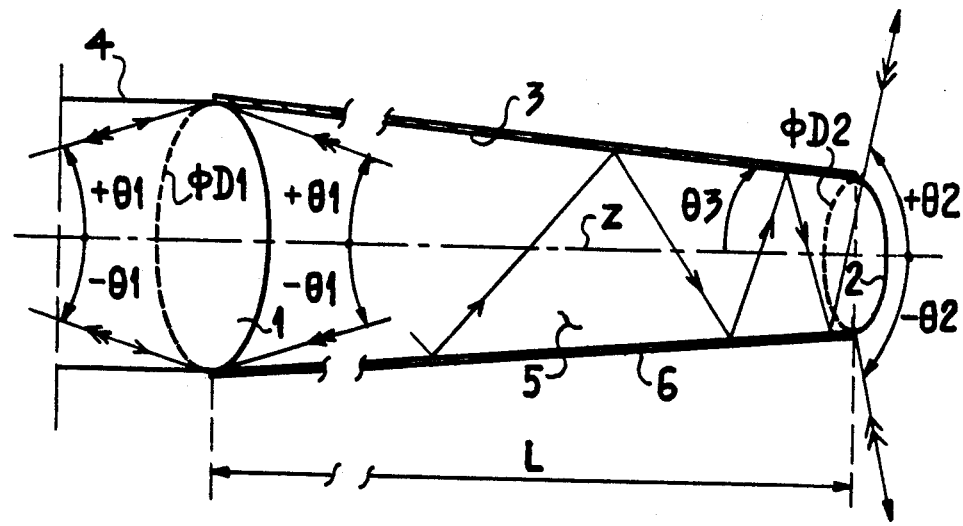
FIG_1
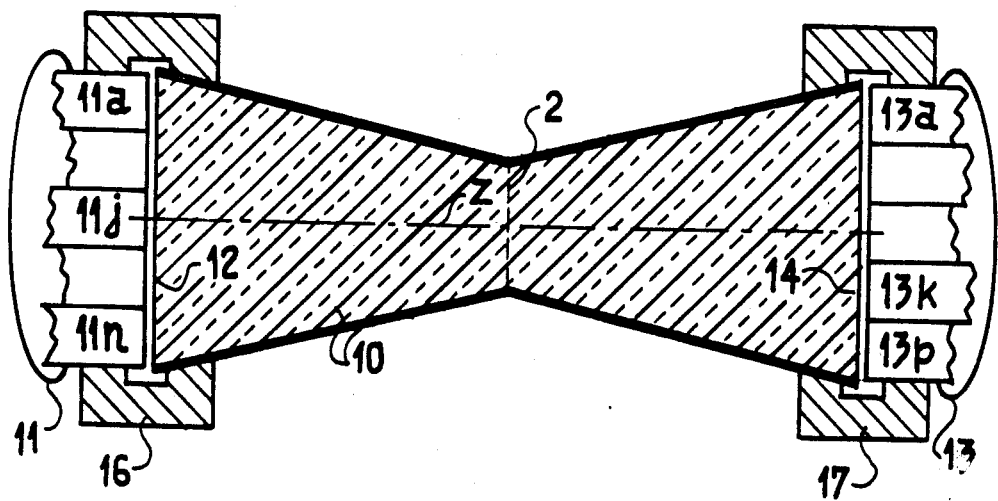
FIG_2

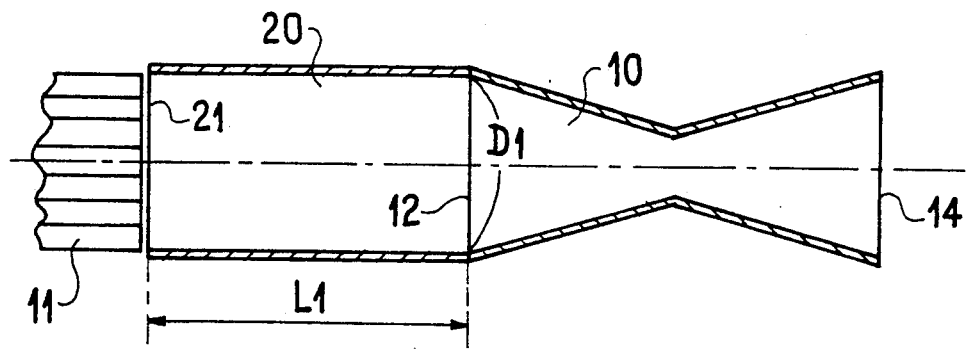
FIG_3
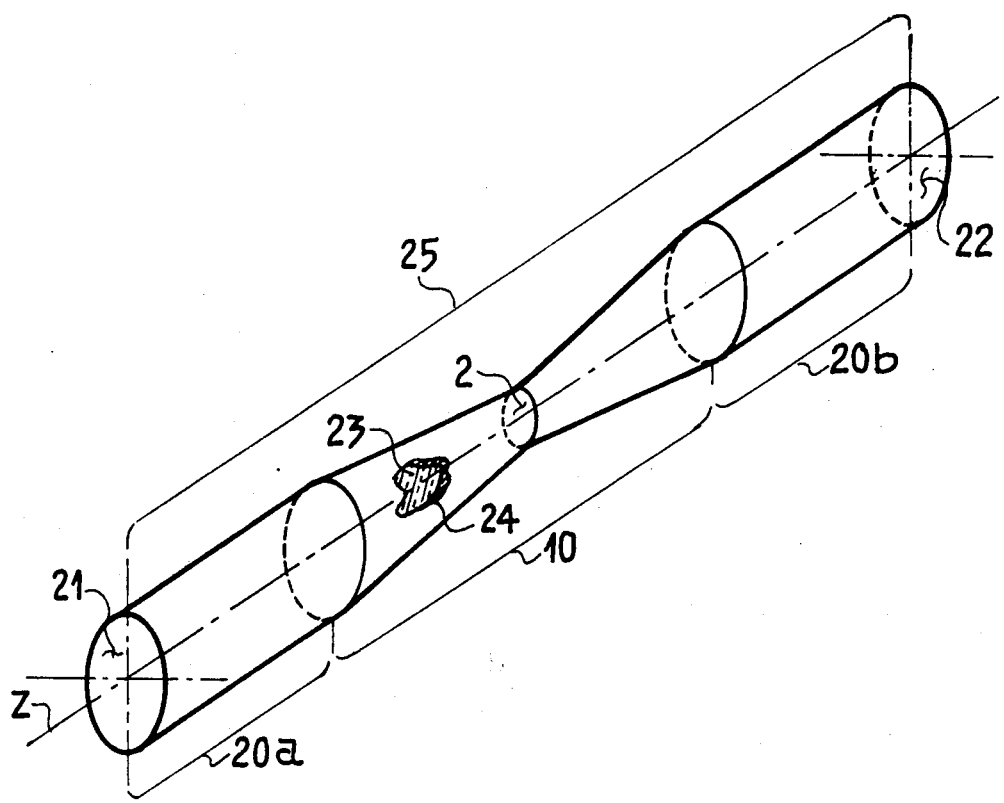
FIG_4

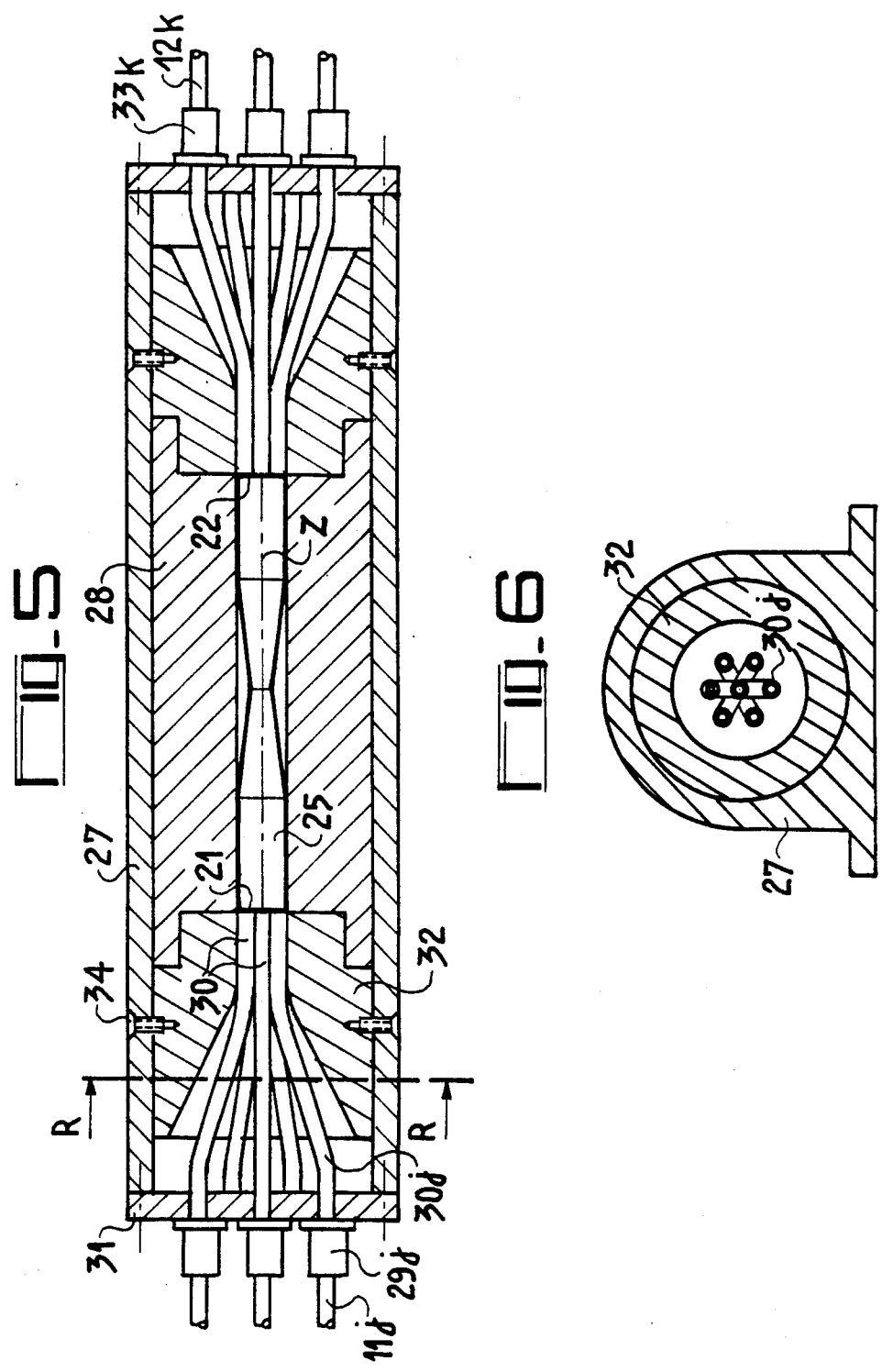

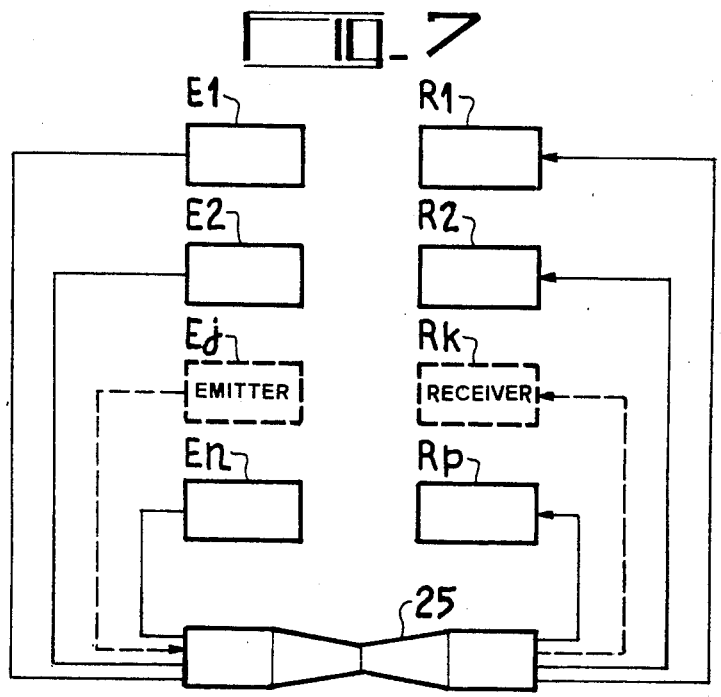
FIG_7
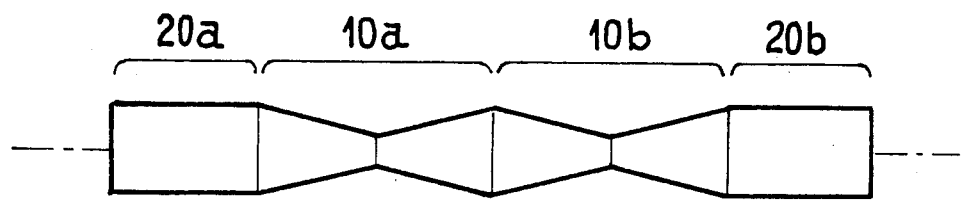
FIG_8
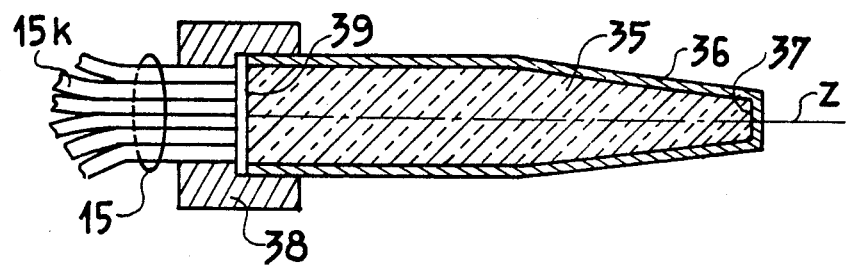
FIG_9

COUPLER FOR OPTICAL COMMUNICATION SYSTEM

The present invention relates to a coupler for connecting light guides in an optical communication system so that signals in the form of light waves may be transmitted from one transmission line to a plurality of other signal transmission lines of the system.

More precisely, the invention relates to the production of a reciprocal optical coupler which enables any one of a group of optical signal transmission lines to be connected to the other lines in this group, or any line in a first group of optical signal transmission lines to be connected to the lines in a second group. When applied to an optical transmission system, such a coupler enables each of the transmission channels to be connected to the various reception channels.

The transmission media utilized in the transmission of frequencies within the frequency spectrum of light are herein referred to as optical signal transmission lines or merely transmission lines which may consist of a single optical waveguide or a bundle thereof. Optical waveguides normally consist of an optical fiber having a transparent core surrounded by a layer of transparent cladding material having a refractive index N2 which is lower than the refractive core index N1.

To establish optical communications between a plurality of points or stations, a variety of interconnection schemes may be utilized.

In an optical communication system utilizing optical waveguides to link different points, these points being provided with light-wave transmission devices and/or light-wave receiving devices, it is in fact often useful and necessary to connect one transmitting point to a plurality of receiving points. Such a configuration is represented, in particular, by a network having no central unit and in which a plurality of user points need to be interconnected, it being understood that each of these has either a transmitter or a receiver or both.

The various links envisaged between each transmitter and the receivers are provided either by using a very large number of light guides if point to point links are formed, or with the aid of optical couplers. The first solution results in a complex structure when the number of interconnected stations is large.

The second solution likewise results in a complex structure since a large number of optical waveguides and optical couplers may be needed when use is made of Y-couplers, remembering that these allow only a single division to be made of the light energy received by an input channel which divides generally into two output channels. In addition Y-couplers do not permit reciprocal operation.

According to known techniques described in particular in U.S. Pat. No. 3,874,780, an optical mixing coupler is provided by an elongated transparent rod such as a piece of glass fibre of large diameter, to the planar endfaces of which are coupled optically the various optical transmission lines to be connected. The device is reciprocal, that is to say it enables any line at one face to be connected to the lines terminating at the other face. In a modified embodiment described in U.S. Pat. No. 3,874,781 the mixed rod is connected by one plane endface to the various optical transmission lines and its other plane endface is made reflective. The light energy coming from an optical signal transmission line is returned by the reflective endface to the surface represented by the junction face. By reflection from the mirror, the light energy from one line is transmitted to all the lines with a substantially uniform distribution, assuming that the dimensions of the mixer and the numerical aperture of the optical waveguides of the transmission lines meet predetermined conditions.

The performance of such a reciprocal rod mixer, with or without a mirror, is not uniform. They present variations in the distribution of light energy over the outlet face depending upon the position of the inlet optical waveguide concerned. If the length of the rod and the accuracy with which the endfaces are machined are increased, these variations may be substantially reduced but they are nevertheless still of the level of a few decibels.

An object of the invention is to provide an optical coupler whose performance is improved from the point of view of uniformity of light distribution to overcome substantially the aforementioned drawbacks.

To this end, use is made of the properties of an optical coupler member comprising an elongated frusto-conical shaped rod of transparent material in which the input radiation pattern, corresponding to the numerical aperture of the guides coupled to the major base, is increased in predetermined proportions related to the dimensions of the frusto-conical member and in particular to the diameters of the bases. These properties are referred to with reference to FIG. 1 in the description which follows and were previously described in the French patent application No. 75.01971 published as U.S. Pat. No. 2,298,806 or in the corresponding U.S. Pat. No. 4,011,005.

In accordance with a feature of the invention, there is provided an optical coupler for connecting optical signal transmission lines in an optical communication system, such that an optical signal in anyone of the lines of a first group of lines is transmitted to all other lines of a second group, each of said lines comprising at least one optical waveguide, said coupler comprising: a propagation medium comprising an elongated bi-conically shaped structure of transparent material formed from two frusto-conical elements having each a peripherical surface between two planar endfaces namely a major base and a minor base which are substantially perpendicular to the longitudinal axis thereof, said frusto-conical element being united end-to-end at the ends at which their minor bases are situated, the minor bases being identical to form a common base; layer means surrounding said propagation medium except said major bases for reflecting light that impringes upon the said peripherical surfaces thereof; and support means for connecting said transmission lines to said major bases respectively such that the optical waveguides of which a said group of transmission line is comprised terminate parallel to the said longitudinal propagation axis with waveguide endfaces disposed in a plane substantially adjacent to the corresponding major base; the diameters of the bases and axial length of the said bi-conical structure being determined to provide a substantially hemispherical radiation pattern at said common base no matter what is the direction of the optical propagation between the said major bases forming the two ends of the said medium, given the numerical aperture value of each of the associated group of transmission lines.

The invention will now be further described with reference to the accompanying drawings, in which:

FIG. 1 is a schematic illustration intended to demonstrate the principle of operation of a frusto-conical shaped optical coupler member;

FIG. 2 shows schematically a first embodiment of an optical coupler according to the invention;

FIGS. 3 to 6 show improved embodiments where FIG. 4 represents a preferred embodiment;

FIG. 7 shows an optical transmission system using an optical coupler according to the invention;

FIG. 8 shows a modified embodiment of the coupler of FIG. 4;

FIG. 9 shows another modified embodiment of the coupler of FIG. 4;

Figure 10:
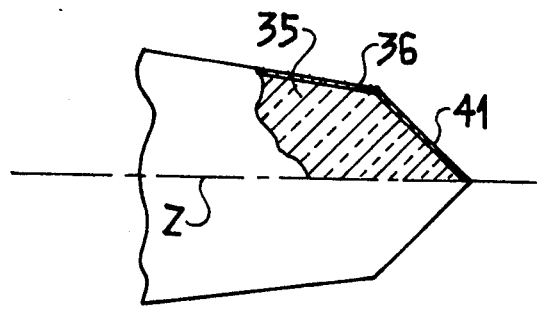
FIGS. 10 to 12 show other possible embodiments of the reflective end of the coupler shown in FIG. 9.

An optical coupler according to the present invention comprises a bi-conical structure resulting from uniting two elongated conically shaped rods end-to-end by their minor bases, or a single elongated conically shaped rod having a reflective minor base.

The principle of operation of the optical coupler will become apparent from what follows in connection with the FIG. 1 which shows, by way of reminder, the operation of one element in the form of a conical frustum. The transparent propagating medium defined by the conical frustum is a body of revolution about an axis Z and is contained between two plane endfaces 1 and 2 which are assumed to be circular and a reflective lateral surface 3. The endfaces correspond respectively to the major base 1 of diameter D1 and the minor base 2 of diameter D2 of the conical frustum, whose height or length is designated L. The major base 1 is assumed to be connected to a light waveguide 4 which is of known numerical aperture A. The axis of optical propagation in the waveguide corresponds to that Z of the conical frustum, at least in the terminal connected part of the transmission line 4.

Light from an ancillary optical source is propagated by the guide 4 to one of its ends which corresponds to the face 1 of the conical frustum. The light rays emerging from the end of the guide are contained within a meridian cone whose apex lies on axis Z which rests on the outline of face 1, and whose half apexangle $\theta_1$ is related to the numerical aperture of the guide. Propagation in an intervening transparent medium which may, in known fashion, be a sealing medium if the guide is bonded by its end to face 1 or which may be an air interface if the guide is set and held in position mechanically at a very short distance from the face 1, is ignored. It is also assumed that the refractive index of the medium forming the frusto-conical element is the same or substantially the same as that N1 of the core of waveguide 4. The deviation angle $\theta_1$ is known as the half acceptance angle and represents the maximum deviation angle of a light ray at any point on entry face 1 and its value is $N1 \sin \theta_1 = A$, A being the numerical aperture value.

The Abbe equation is applicable to the frusto-conical element and gives the relation:

$$D1 \sin \theta_1 = D2 \sin \theta_2$$

which implies that radiation leaving through face 2 is contained within a cone whose half apex-angle is $\theta_2$.

The diameter D2 is made equal to, or close to but slightly greater than, $D1 \sin \theta_1$, so that angle $\theta_2$ is equal to $\pi/2$ or slightly less than this value. If it is equal this means that the value of $\sin \theta_2$ is exactly 1.

The converse state of inequality, which is not admissable that is to say D2 being less than $D1 \sin \theta_1$, would mean that part of the light energy would be reflected back towards the guide, which has to be prevented.

Consequently, by selecting the diameter D2 as indicated, the exit face 2 behaves as an emitter having a hemispherical or substantially hemispherical radiation diagram and an aperture angle equal to the angle $\theta_2$, that is to say equal to or slightly less than $\pi/2$.

If the indices of the optical waveguide 4 and the medium formed by the frusto-conical element are different, the above equation is written:

$$D1 \sin \theta_4 = D2 \sin \theta_2$$

with $$N1 \sin \theta_1 = N3 \sin \theta_4$$

N1 and N3 being the indices of the guide and the coupler respectively. With an optical fibre guide 4 consisting of a core of index N1 and a cladding of index N2 the numerical aperture A is equal to $A = N1 \sin \theta_1 = \sqrt{N1^2 - N2^2}$ and consequently the condition which the diameter D2 has to meet is that it should be equal to or slightly greater than the value $D1 \times (A/N3)$.

It should be pointed out that the length L of the frusto-conical element plays no part in the above equation. Nevertheless it is necessary that this length be made sufficient that propagation in the frusto-conical medium take place with multiple total reflections at the wall 3, as is shown by way of example in the case of a single ray, in order to assist towards uniform light distribution in the meridional cone of half apex-angle $\theta_2$. Assuming that the indices of the guide and the frusto-conical medium are the same, it can easily be calculated that the half angle $\theta_3$ of the conical frustum needs to be less than a maximum value of $\theta_{3M} = \pi/4 - \theta_1/2$, which results in a minimum length value Lm which is given by: $Lm = (D1 - D2)/2(tg)(\pi/4 + \theta_1/2)$. When the indices are different, the value $\theta_1$ must be replaced by $\theta_4$, an angle whose sine is equal to $A/N3$ as indicated above, A being the numerical aperture of the guide and N3 the refractive index of the frusto-conical element. By way of example, if the indices are assumed to be identical and $\theta_1$ to be equal to 15°, the value of the diameter D2 is approximately D1/4 and the minimum value Lm equal to approximately D1/2. This value Lm is small and in practice length L preferably made large in comparison with diameter D1 and will generally be several times the value of D1, to give frusto-conical element whose half apex-angle $\theta_3$ is small.

It should equally be pointed out that the Abbe equation also applies in the opposite direction, that is to say where the hemispherical incident radiation on face 2 is contained in the cone of half apex angle $\theta_2$, the radiation emerging from face 1 is contained within a cone whose half apex angle $\theta_1$ corresponds to the numerical aperture of the guide 4. Similarly, the distribution of light in this cone will be substantially uniform if the length L is made sufficiently great to produce several internal reflections at the lateral surface 3.

The transparent propagating medium of frusto-conical shape can be produced from a glass body 5 covered with a metallic deposit 6 to produce the reflective interface 3.

FIG. 2 is a simplified view of a first possible embodiment of the mixing coupler according to the invention in which the main component is that 10 which results from the union of two frusto-conical elements of the kind already described at the ends where their minor bases are situated. In the kind of operation described above, each of the transmission lines, such as 11j for example, in a first group 11 of lines 11a to 11n which arrive at one 12 of the terminal faces will be coupled optically to the various lines 13a to 13p in a second group of transmission lines situated at the other terminal face 14. At 16 and 17 are indicated supporting means to combine the various waveguides of these lines into a single bundle along the axial direction of propagation Z in such a way that the endfaces of the waveguides in each group 11 and 13 terminate adjacent to the plane of the associated major base 12 or 13. The manner of coupling shown in the figure involves a small gap or interface which may be air or which may be formed by a transparent material of predetermined refractive index.

The body 10 of the coupler may be produced all in one piece by moulding and/or machining, or by sealing two frusto-conical elements together at the end where their minor bases, which are of the same diameter, are situated. The transparent body 10 could also be asymmetrical, having for example major bases 12 and 14 of the same diameter but with the lengths of the conical frusta different in the direction of axis Z. The symmetrical version is preferable however. Asymmetry may for example be considered if the numerical aperture of the lines 13 is different from that of the lines 11, the diameters of the faces 12 and 14 being calculated accordingly.

It may be mentioned that in the device shown in FIG. 2, the distribution of light in the plane of the exit face 14 is not necessarily the same for all the guides 11a to 11n, given the different positions occupied by these guides in the plane of the entry face 12. Considered individually, the emitting guides 11 represent, at their ends, an emitting area which is only a fraction of the total area of the entry face 12, whereas in the case of operation which was explained with reference to FIG. 1 the whole of the entry face, i.e. the major base of the conical frustum, was assumed to be emitting.

To achieve a uniform and substantially identical distribution of light at the exit no matter which entry guide is considered, the coupling device is preferably arranged as shown in the diagram of FIG. 3. In addition to the aforementioned medium 10 it also includes a propagating medium 20 in the form of a conventional cylindrical mixing rod whose diameter corresponds to that D1 of the major bases and whose length L1 is determined as a function of the numerical aperture $\theta 1$ of the entry guides so that each point on the entry face 21 will illuminate the whole of the area 12. The rod may be formed by a piece of fibre of large diameter. If the core of the rod has the same index as that N1 of the entry guides 11, the condition which the length L1 must satisfy is $L1 \geq D1/\tan \theta 1$.

In practice, the combination of 20 and 10 will preferably form a continuous whole and a second rod will form a symmetrical extension of the block at the end where face 14 is situated to allow reciprocal operation with the same characteristics. This results in the preferred improved embodiment shown in FIG. 4, in which the mixer 25 comprises a block of glass 23 which combines the two conical frusta and the terminal cylindrical portions and in which the entire circumferential surface is covered by a reflective metallic deposit 24.

FIGS. 5 and 6 show a possible embodiment of the optical coupler of FIG. 4 which has connectors for making connections to the groups of guides 11 and 12. In the longitudinal section in FIG. 5, the mixing block is arranged in a housing 27 and is held in position by means of a support piece 28. The guides (fibres or fibre bundles) 11j in the first group 11 are coupled by connectors 29j which each correspond to a single fibre 30j. The connectors are arranged on a cover 31. The fibres 30j are combined by a mechanical part 32 into a cylindrical bundle 30 which terminates adjacent to the planar endface 21 of the mixer. Similar arrangements are made at the side where the second endface 22 of the mixer is situated to give connectors 33 for connection to the guides in the second group 12. Fastening member such as screws 34 are provided to hold the components in position. FIG. 6 shows a cross-section on RR.

It will be realised that the optical coupler is reciprocal and that the terms entry face and exit face which are used are not to be considered as limiting. These terms apply, in particular, for the application to an optical transmission system of the kind shown in FIG. 7. Each emitter E1 to En is connected to an entry face to the coupler 25 and each receiver R1 to Rp to the exit opposite face. Each of the n emitting points is connected by the coupler to the p receiving points. When the application is to the transmission of messages between user points, any user point may thus communicate with any other user point, the identity of the user points which are intended to receive the message being established in a known manner such as by an address code. In other applications, such as in particular the transmission of control signals, there may be any number of emitters and receivers located at separate points.

Without exceeding the scope of the invention, the optical coupler may also be produced in other forms by using a plurality of bi-conical elements (10, FIG. 2) placed end-to-end. FIG. 8 shows an embodiment made up of two bi-conical elements 10a and 10b and two cylindrical mixers 20a and 20b.

Another particularly useful embodiment is produed by making one of the terminal faces reflective, the other face then accepting all the transmission lines to be interconnected and performing the function of both entry and exit face. In the design of optical coupler shown in FIG. 2, if face 14 is made reflective a device is obtained which is equivalent to that formed by two bi-conical combinations 10 placed end-to-end. Similarly, if it is assumed that face 2 is made reflective, an effect is produced equivalent to that produced by the single bi-conical arrangement 10. Such a device is shown in FIG. 9. The single frusto-conical element advantageously continues into a cylindrical mixer rod to form a coupler equivalent to the preferred embodiment 25 in FIG. 4. The frusto-conical section and the cylindrical section may be realized with a block 35 of transparent material covered on the periphery and on the minor endface 37 by a metallic deposit 36. The major face 39 is coupled optically to the waveguides 15k to be interconnected, which are thus combined into a single group 15. The support means 38 may be produced as described in reference to FIGS. 5 and 6.

Figure 11:
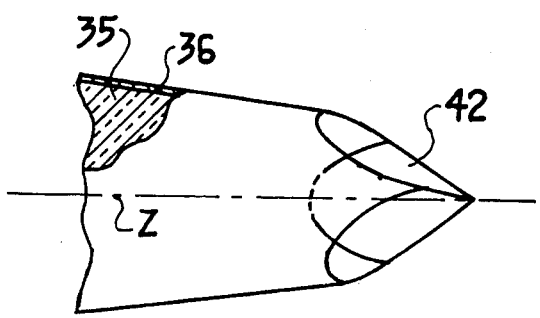
Figure 12:
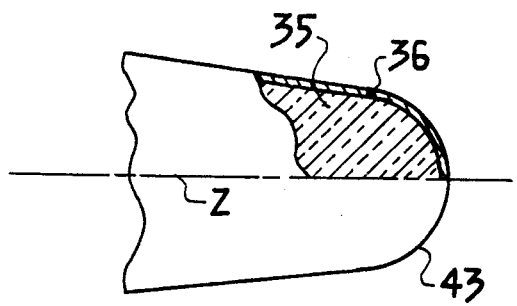

FIGS. 10, 11 and 12 represent modified embodiments of the reflective endface 37 of the optical coupler as in FIG. 9. In FIG. 10, the plane face is replaced by a reflective dihedral 41 consisting of two mutually orthogonal planes which are symmetrical about the axis Z, the edge of the dihedral being orthogonal to the axis Z. The planes of the dihedral are covered by a metal coating 36 and the block 35 continues as far as these planes. In a modification shown in FIG. 11, the end of the block 35 is formed by a trirectangular trihedral 42 which is made reflective by means of a metal coating 36. The trihedral 42 has the axis Z as its axis of symmetry and consequently its point lies in this axis. Finally, in the version shown in FIG. 12, the end of the block 35 is rounded to form a hemisphere 43 which is metal coated by means of a deposit 36. Other modifications are possible and FIG. 10, for example could equally well apply to a conical end. It is understood that the above modifications are equally applicable in cases where the major base is assumed to be reflective.

In the reflective coupling devices which are described above with reference to FIGS. 9 to 12, the lines form a single group of waveguides 15 and any line 15k in the group is connected by the coupler to all the other lines. Each line may be connected at the other end to a receiver or a transmitter or again, via a Y-coupler, to a transmitter/receiver combination. In the context of an application of the kind shown in FIG. 7, the reflective coupler enables the number of lines to be reduced, given that a transmitter/receiver station may be connected to the coupler by a single transmission line.

From the point of view of the production of the devices described, it seems preferable to produce the coupler in the form of a block of glass whose index corresponds to that of the core of the fibres of the waveguides to be connected, this block being covered with a metal deposit on the surfaces which are to be made reflective.

Among other embodiments which may be contemplated, particular attention is drawn to hollow forms where the one-piece medium above is formed by air, this medium being defined by polished metal parts which have been made reflective on the inside. Thus, in an embodiment as shown in FIG. 5 for example, the support member 28 may be produced in the form of two parts or shells which fit together and which are machined on the inside so that the hollow in each forms half the volume represented by the coupler 25 in longitudinal section.

What is claimed is:

1. An optical coupler for connecting optical signal transmission lines in an optical communication system, such that an optical signal in anyone of the lines of a first group of lines is transmitted to all other lines of a second group, each of said lines comprising at least one optical waveguide, said coupler comprising: a propagation medium having a revolution shape about an optical propagation axis and including first and second planar endfaces substantially perpendicular to said axis; at least one optical mixer in the form of an elongated cylindrically shaped rod having first and second planar and parallel faces, said first face constituting said first endface; first and second elongated rods in the shape of truncated cones forming a biconical structure each having parallel and planar faces namely a major base and a minor base and being united end to end by their minor bases which are identical, said first frusto-conical rod being further united by its major base to said second face of said optical rod mixer whose cross-section corresponds to the associated major base; layer means surrounding said propagation medium except said planar endfaces for reflecting light that impinges upon the peripheral surface thereof; and support means for connecting said transmission lines to said endfaces respectively such that the optical waveguides of which a group of transmission lines is comprised terminate parallel to the said optical propagation axis with waveguide endfaces disposed in a plane substantially adjacent to the corresponding endface; the diameters of said bases and axial length of said bi-conical structure being determined to provide a substantially hemispherical radiation pattern at said minor bases no matter what is the direction of the optical propagation along said axis, given the numerical aperture value of each of the associated group of transmission lines.

2. A coupler according to claim 1, wherein said propagation medium includes a second optical mixer in the form of an elongated cylindrically shaped rod whose cross-section corresponds to the major base of the second frusto-conical rod to which it is united end-to-end.

3. A coupler according to claim 2, wherein the said propagation medium is formed by a block of transparent material of circular cross-section and the periphery of which, with the exception of its ends, is covered with a metallic deposit.

4. A coupler according to claim 2, wherein the support means at each coupler end comprises connectors to connect the end of each transmission line of a group optically to an optical fibre and a mechanical part to group the said fibres into a single bundle which terminates at the said corresponding coupler end.

5. A coupler according to claim 1, wherein the propagation medium comprises a plurality of bi-conical structures which are united end-to-end by identical major bases.

6. An optical coupler for connecting optical signal transmission lines in an optical communication system, such that an optical signal in anyone of said lines is transmitted to all other lines of the system, each of said lines comprising at least one optical waveguide, said coupler comprising: a propagation medium having a revolution shape about an optical propagation axis and including first and second planar endfaces substantially perpendicular to said axis; an optical mixer in the form of an elongated cylindrically shaped rod having first and second planar and parallel faces, said first face constituting said first endface, an elongated rod in the shape of a truncated cone having parallel and planar faces namely a major base and a minor base said minor base constituting said second endface, said frusto-conical rod being united end-to-end by its major base to the second face of said optical rod mixer whose cross-section corresponds to the associated major base; layer means surrounding said propagation medium except said first endface for reflecting light that impinges upon the peripheral surface and said minor base thereof; and support means for connecting said transmission lines to said first endface such that the optical waveguides of which said transmission lines are comprised terminate parallel to said axis with waveguide endfaces disposed in a plane substantially adjacent to said first endface; the diameter of the bases and the axial length of said frusto-conical structure being determined to provide a substantially hemispherical radiation pattern at said minor base, given the numerical aperture value of the said transmission lines.

7. A coupler according to claim 6, wherein said second endface is produced in the form of a trirectangular trihedral.

8. A coupler according to claim 6, wherein the said medium is formed by a block of transparent material of circular cross-section and the periphery of which, with the exception of the end for connection to the lines is covered by a metallic deposit.

* * * * *